United States Patent
Capdevila Cascante et al.

(10) Patent No.: US 11,581,620 B2
(45) Date of Patent: Feb. 14, 2023

(54) WAVEGUIDE FILTER SUITABLE FOR AN ADDITIVE MANUFACTURING METHOD

(71) Applicant: SWISSto12 SA, Renens (CH)

(72) Inventors: Santiago Capdevila Cascante, Renens (CH); Tomislav Debogovic, Chexbres (CH); Esteban Menargues Gomez, Préverenges (CH)

(73) Assignee: SWISSTO12 SA, Renens (CH)

( * ) Notice: Subject to any disclaimer, the term of this patent is extended or adjusted under 35 U.S.C. 154(b) by 0 days.

(21) Appl. No.: 17/294,014

(22) PCT Filed: Jul. 14, 2020

(86) PCT No.: PCT/IB2020/056590
§ 371 (c)(1),
(2) Date: May 14, 2021

(87) PCT Pub. No.: WO2021/009667
PCT Pub. Date: Jan. 21, 2021

(65) Prior Publication Data
US 2022/0006169 A1   Jan. 6, 2022

(30) Foreign Application Priority Data

Jul. 15, 2019  (FR) ..................... 1907958

(51) Int. Cl.
*H01P 1/207* (2006.01)
*H01P 11/00* (2006.01)

(52) U.S. Cl.
CPC ........... *H01P 1/207* (2013.01); *H01P 11/002* (2013.01)

(58) Field of Classification Search
CPC ............................... H01P 1/207; H01P 11/002
See application file for complete search history.

(56) References Cited

U.S. PATENT DOCUMENTS

| | | | |
|---|---|---|---|
| 5,600,740 A | 2/1997 | Asfar | |
| 8,952,678 B2 * | 2/2015 | Giboney | .............. G01R 1/24 333/21 A |
| 9,190,706 B2 * | 11/2015 | Nath | ................. H01P 11/001 |
| 9,312,589 B2 * | 4/2016 | Sherrer | ................ H05K 1/0221 |
| 11,283,143 B2 * | 3/2022 | Aston | .................... B22F 5/10 |
| 2010/0308938 A1 | 12/2010 | Arregui Padilla et al. | |
| 2012/0000849 A1 | 1/2012 | Fassbender | |
| 2014/0266961 A1 | 9/2014 | Tavassoli Hozouri | |

(Continued)

FOREIGN PATENT DOCUMENTS

FR    2889358 A1    2/2007

OTHER PUBLICATIONS

International Search Report for PCT/IB2020/056590 dated Sep. 28, 2020.

(Continued)

*Primary Examiner* — Hafizur Rahman
*Assistant Examiner* — Kimberly E Glenn
(74) *Attorney, Agent, or Firm* — Pearne & Gordon LLP

(57) ABSTRACT

A waveguide filter having a core including an external face and internal faces defining a channel for filtering and guiding the waves. The channel includes several slots, each having a first and a second face. The first face is inclined in relation to the second face. A method for manufacturing the waveguide filter.

14 Claims, 8 Drawing Sheets

(56) References Cited

U.S. PATENT DOCUMENTS

2015/0295300 A1* 10/2015 Herbsommer ........ H01P 11/006
333/81 B
2019/0356033 A1* 11/2019 Dogiamis ................. H01P 3/16

OTHER PUBLICATIONS

Written Opinion for PCT/IB2020/056590 dated Sep. 28, 2020.
Arnedo, I et al. "Spurious removal in satellite output multiplexer power filters", Microwave Conference, 2007. European, IEEE, PI, Oct. 9, 2007, pp. 67-70, XP031191735.
Shen, Junyu et al. "Additive Manufacturing of Complex Millimeter-Wave Waveguides Structures Using Digital Light Processing", IEEE Transactions on Microwave Theory and Techniques, Plenum, USA, Jan. 4, 2019, pp. 883-895, vol. 67, No. 3, [retrieved on Mar. 5, 2019], XP011712909.
Peverini, Oscar A et al. "Selective Laser Melting Manufacturing of Microwave Waveguide Devices", Proceedings of the IEEE, IEEE. New York, US, Jan. 2, 2017, pp. 620-631, vol. 105, No. 4, [retrieved on Mar. 22, 2017], XP011643483.
Peverini, Oscar A. et al. "Additive manufacturing of Ku/K-band waveguide filters: a comparative analysis among selective-laser melting and stereo-lithography", Jet Microwaves, Antennas & Propagation, United Kingdom, Nov. 19, 2017, pp. 1936-1942, vol. 11, No. 14, XP055532398.

* cited by examiner

WAVEGUIDE FILTER SUITABLE FOR AN ADDITIVE MANUFACTURING METHOD

TECHNICAL FIELD

The present invention relates to a waveguide device and, more specifically, to a waveguide filter suitable for an additive manufacturing method. The invention also relates to a method for the additive manufacturing of such a filter.

PRIOR ART

Radiofrequency (RF) signals can propagate either in space or in waveguide devices. Waveguide filters are waveguide devices that are used to manipulate the RF signals in the frequency domain. Examples of the use of microwave filters are particularly found in satellite communications.

A wide range of different types of waveguide filters exists. For example, corrugated waveguide filters, also called ridged waveguide filters, comprising a channel provided with a certain number of ridges, or teeth, which periodically reduce the internal height of the waveguide. They are used in applications that simultaneously require a wide passband, good matching of the passband and a wide stopband. It basically involves low-pass models contrary to most of the other forms that are generally of the bandpass type. The distance between the teeth is much shorter than the typical distance λ/4 between the elements of other types of filters.

U.S. Pat. No. 5,600,740 describes a bandpass waveguide filter, the channel of which is provided with sinusoidal corrugations with an abrupt change of phase at one point. The corrugations are produced by depositing metal onto a smooth core, which limits the maximum height of the corrugations that can be achieved with a given time and deposition cost. Manufacturing the core is also complex.

Document US 2014/266961 describes a waveguide filter provided with walls with a constant thickness. The channel section changes size along the propagation path of the wave, which allows a transformation function to be filtered or applied to this wave. Producing such a monolithic waveguide from metal is complex.

Document US2010/308938 describes a low-pass waveguide filter, for which the walls with a substantially constant thickness comprise oscillations with a variable height for filtering the signal and rejecting different frequency bands. Producing such a waveguide from metal is also very complex.

ARNEDO ET AL, "Spurious removal in satellite output multiplexer power filters", European Microwave Conference, 9 Oct. 2007, XP031191735 describes another waveguide, for which the walls with a substantially constant thickness form oscillations. Manufacturing this waveguide requires numerous steps of laser cutting, electroforming, electrodeposition, and acid etching.

FR 2889358 is another example of a waveguide filter with walls that are corrugated and have a constant thickness. This document does not describe how this complex shaped filter can be manufactured.

The aforementioned waveguides made of conductive material can be manufactured by extrusion, folding, cutting, electroforming, for example. Producing waveguides with complex sections, in particular ridged waveguide filters, using these conventional manufacturing methods is difficult and expensive.

However, recent work has demonstrated the possibility of producing waveguides, including filters, using additive manufacturing methods. In particular, additive manufacturing of waveguides formed in conductive materials is known.

Waveguides comprising walls made of non-conductive materials, such as polymers or ceramics, manufactured using an additive method, then covered with metal plating, have also been proposed. For example, US 2012/00849 proposes producing waveguides by 3D printing. To this end, a core made of non-conductive plastic is printed using an additive method, then covered with metal plating by electrodeposition. In fact, the internal surfaces of the waveguides must be electrically conductive in order to operate.

Another example of a method for manufacturing waveguides by 3D printing is described in SHEN ET AL, "Additive Manufacturing of Complex Millimeter-Wave Waveguides Structures Using Digital Light Processing", Transactions on microwave theory and techniques, 4 Jan. 2019, XP011712909, which describes a message for printing complex shaped waveguides by additive manufacturing.

The use of a non-conductive core allows, on the one hand, the weight and the cost of the device to be reduced and, on the other hand, 3D printing methods to be implemented that are suitable for polymers or for ceramics and that allow high precision parts to be produced with minimal wall roughness.

Waveguides are also known in the prior art that comprise a metal core produced by 3D printing; in this case, additive manufacturing particularly affords significant freedom with respect to the shapes that can be produced.

Additive manufacturing is typically carried out using successive layers parallel to the transverse section of the filter, with the longitudinal axis of the opening through the waveguide thus being vertical during printing. This arrangement guarantees the shape of the opening, and avoids the deformation that would occur following the collapse of the upper wall of the opening before hardening in the case of printing in a different direction.

Some waveguide filters, in particular waveguide filters provided with resonant cavities (corrugated waveguide filter), due to their shape, are nevertheless difficult to manufacture using additive manufacturing methods. Indeed, attempts to manufacture using an additive manufacturing method have shown that some parts of the waveguide filter can be protruding, in particular the walls of the cavities or the teeth of the corrugated waveguide filters. Consequently, these protruding parts can collapse under the effect of gravity during the manufacturing process.

The additive manufacturing method therefore needs to be interrupted during the manufacturing process in order to add braces so as to ensure the stability of the structure to be printed, which can prove to be complicated and tedious and can significantly impact the speed and the control of the manufacture of this type of filter using additive methods.

Consequently, an aim of the present invention is to propose a method for manufacturing a waveguide filter that does not have the above limitations, and in particular a manufacturing method that allows waveguide filters to be produced reliably, easily and quickly.

Another aim of the present invention is to propose a waveguide filter that is better suited to an additive manufacturing method.

BRIEF SUMMARY OF THE INVENTION

According to the invention, these aims are particularly achieved by means of a method for manufacturing a waveguide filter comprising:

additive manufacturing of a core comprising at least one external face and internal faces defining a channel for filtering and guiding the waves, with at least one of said internal faces comprising a plurality of slots in order to filter the waves passing through the channel;

depositing a metal layer onto said internal faces of the core;

wherein the longitudinal axis of the channel of the waveguide filter is oriented vertically when it is manufactured, each slot thus comprising an upper face that is protruding during manufacturing;

the protruding face of said slots being non-horizontal when the core is manufactured.

Thus, the ease of manufacturing arises both from a particular manufacturing method (additive manufacturing, with the longitudinal axis in a vertical position) and a particular design of the slots in order to avoid the protruding portions.

The slots form filtering cavities or sections.

The slots are formed in the core of the waveguide, then covered with an electroconductive layer.

Tests and simulations have unexpectedly shown that the shape of the slots with a slanting upper face does not limit the possibilities of producing filters with any frequency responses in a given space requirement. In other words, the filters that are thus manufactured are equally as effective as the filters of the prior art.

At least one external face of the core is advantageously devoid of slots. This facilitates the manufacture of the filter, the external faces of which are thus devoid of the protruding sections, at least in relation to the slots in the channel. This also, if necessary, allows the core of the filter to be reinforced, or allows it to be provided with a shape that is selected as a function of weight and stiffness constraints, and independently of the transfer function of the channel.

The walls of the core thus can have a variable thickness.

In one embodiment, two adjacent slots are separated from each other by a tooth projecting into said channel, said tooth comprising a lower face and an upper face, the lower face being inclined in relation to the upper face and in relation to the horizontal during the additive manufacturing of the core.

The lower face of each tooth advantageously forms an angle (a) ranging between 20° and 80°, preferably between 20° and 40° in relation to the horizontal when the core is manufactured.

The teeth can be triangular.

The teeth can be trapezoidal.

In one embodiment, said slots comprise a lower face and an upper face, the upper face being inclined in relation to the upper face and in relation to the horizontal during the additive manufacturing of the core.

The channel advantageously has a square or rectangular transverse section orthogonal to its longitudinal axis, the slots being arranged along exactly two opposite walls of the channel.

The slots arranged along a wall of the channel are advantageously aligned opposite slots arranged along the opposite wall of the channel.

In this case, the filter does not have axial symmetry, but only planar symmetry.

The channel has, for example, a square or rectangular transverse section orthogonal to its longitudinal axis, the slots being arranged along a single wall of the channel.

In this case, the filter has neither axial symmetry nor planar symmetry.

The waveguide filter can comprise a ridge arranged along a wall of the channel that is devoid of slots.

The invention also relates to a waveguide filter obtained by the above method.

The core can be formed by a conductive material.

The core can be formed by a non-conductive material. In this case, said internal faces are covered with a metal layer.

The inclined face of each tooth or slot is preferably slanting in relation to a plane orthogonal to the longitudinal axis of the channel.

According to one embodiment, the waveguide filter comprises at least three slots on a single wall of the channel or on each of two opposite walls of the channel.

According to one embodiment, the inclined face of each slot is a rotary face extending over 360° about the longitudinal axis of the channel.

According to one embodiment, the core is obtained by SLM (Selective Laser Melting) additive manufacturing.

A further aim of the invention is a waveguide filter comprising a core comprising at least one external face and internal faces defining a channel for filtering and guiding the waves. The channel comprises a plurality of slots each comprising a first and a second face. The first face is inclined in relation to the second face.

BRIEF DESCRIPTION OF THE FIGURES

Embodiments of the invention are provided in the description illustrated by the accompanying figures, in which.

EMBODIMENTS OF THE INVENTION

Figure 1:
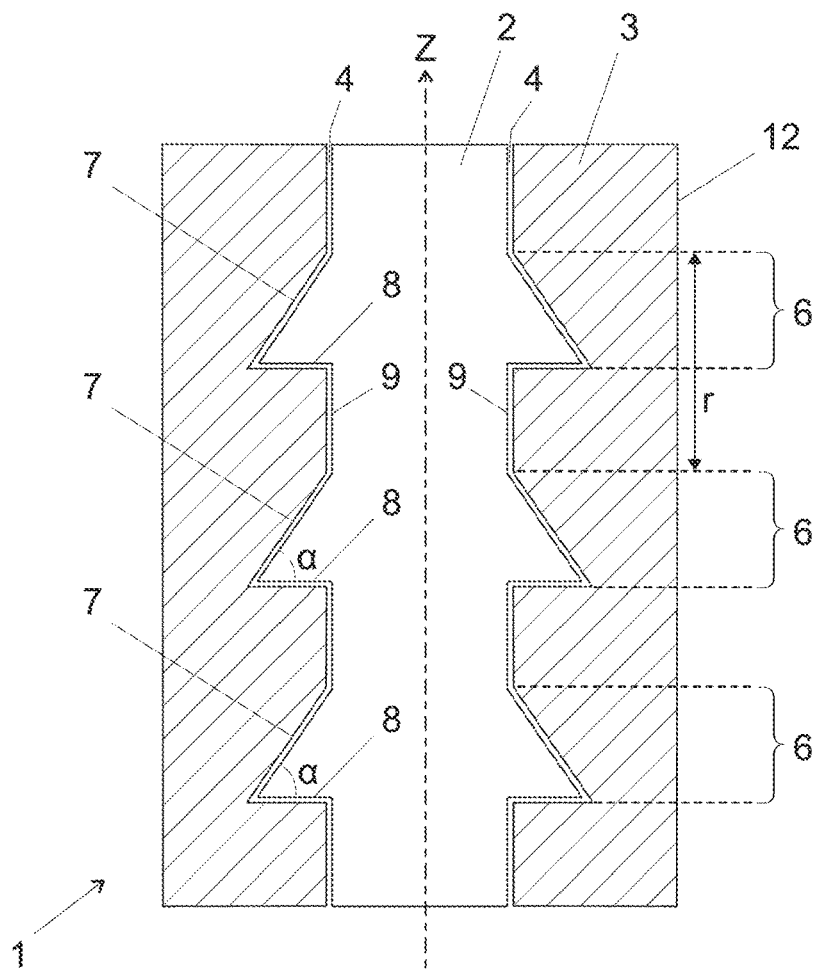
FIG. 1 illustrates a longitudinal section along a waveguide filter according to one embodiment of the invention.
Figure 2:
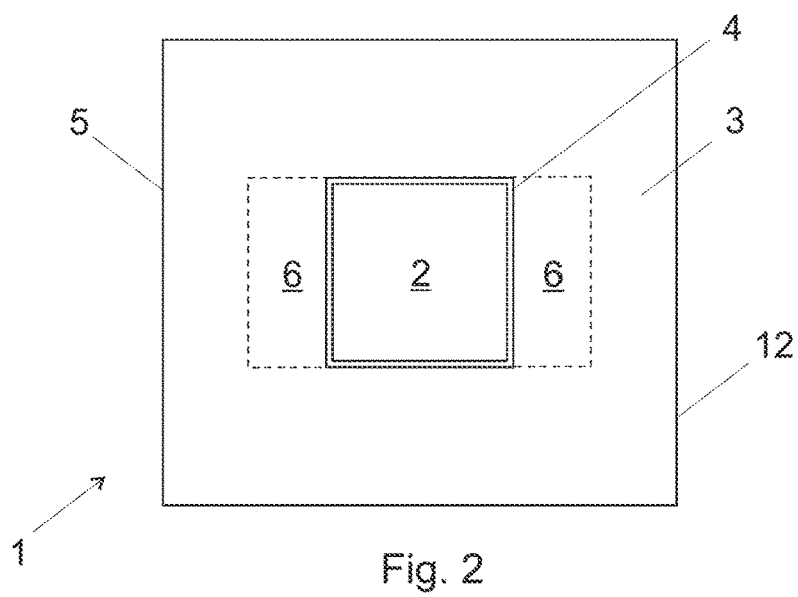
FIG. 2 is a top view of the waveguide filter of FIG. 1.

The waveguide filter according to the embodiment illustrated in FIGS. 1 and 2 comprises a core 3 comprising a plurality of internal faces 7, 8, 9, which are covered with a metal film 4 and which define a channel 2 configured to filter an electromagnetic signal at a predefined passband and operating band. For example, the filter is designed to allow through a narrow passband within a frequency range of the order of 1 GHz-80 GHz.

The core 3 comprises an external face 12, the shape of which is similar, for example, to a straight prism, whereas the channel 2 comprises a plurality of slots 6 or corrugations, i.e. cavities forming filtering sections 6. The slots or corrugations radially extend around the channel 2, the diameter of which they thus broaden in a plurality of longitudinal sections. The section of the slots 6 is in the shape of a triangle or rectangle in the section of FIG. 1. The adjacent slots 6 are longitudinally spaced apart in pairs by a step p.

The geometrical shape of the core 3 is determined so that the proportions, the shape and the position of the various slots 6 of the channel 2 along its longitudinal axis z are configured as a function of the frequency of the electromagnetic signal to be transmitted or filtered.

The geometrical shape of the core 3 can be determined, for example, by computer software as a function of the desired passband. The computed geometrical shape can be stored in a computer data medium.

The core 3 is manufactured using an additive manufacturing method. In the present application, the expression "additive manufacturing" denotes any method for manufacturing the core 3 by adding material, according to the computer data stored on the computer medium and defining the geometrical shape of the core 3.

The core 3 can be manufactured, for example, using an additive manufacturing method of the SLM (Selective Laser Melting) type. The core 3 also can be manufactured using other additive manufacturing methods, for example, by hardening or coagulation of liquid or powder in particular, including, yet without being limited to, methods based on stereolithography, ink jets (binder jetting), DED (Direct Energy Deposition), EBFF (Electron Beam Freedom Fabrication), FDM (Fused Deposition Modeling), PFF (Plastic Free Forming), by aerosols, BPM (Ballistic Particle Manufacturing), SLS (Selective Laser Sintering), ALM (Additive Layer Manuafcturing), polyjet, EBM (Electron Beam Melting), photopolymerization, etc.

The core 3 can be, for example, made of photopolymer manufactured using a plurality of superficial layers of liquid polymer hardened by ultraviolet radiation during an additive manufacturing method.

The core 3 also can be formed from a conductive material, for example, a metal material, using an additive manufacturing method of the SLM type, in which a laser or an electron beam melts or sinters a plurality of thin layers of a powder material.

According to one embodiment, the metal layer 4 is deposited in the form of a film by electrodeposition or galvanoplasty onto the internal faces 7, 8, 9 of the core 3. The metallization allows the internal faces of the core 3 to be covered with a conductive layer.

The application of the metal layer can be preceded by a step of treating the surface of the internal faces 7, 8, 9 of the core 3 in order to promote the bonding of the metal layer. The surface treatment can include increasing the surface roughness and/or depositing an intermediate bonding layer.

However, the conventional additive manufacturing methods are not particularly well suited for conventional waveguide filters, in particular ridged waveguide filters that comprise a certain number of cavities 6, since the arrangement of these cavities creates protruding portions in the channel 2, which are difficult to maintain when printing the various strata. Consequently, braces for these protruding portions must be installed during the additive manufacturing process in order to prevent these parts from collapsing under the effect of gravity.

According to one aspect, and in order to overcome this disadvantage, the waveguide 1 is printed with the longitudinal axis z of the channel 2 in a vertical, or at least substantially vertical, position.

According to another aspect, the slots 6 of the channel 2 are designed so as to facilitate this additive printing in a vertical position. To this end, the channel 2 of the waveguide filter 1 comprises a plurality of slots 6 separated from each other by portions 9 of the channel 2.

Each slot or corrugation 6 thus comprises a face that is protruding when the filter is manufactured in a vertical position. In the example of FIG. 1, the upper face 7 of the slots 6 is protruding during the additive manufacturing thereof. The second lower face 8 of the slots 6 for its part extends in a plane substantially perpendicular to the longitudinal axis of the channel 2, i.e. a horizontal plane during manufacturing.

In order to allow additive printing, the protruding upper face 7 is inclined in relation to the lower face 8 and in relation to the horizontal in a vertical manufacturing position. In a preferred embodiment, the face 7 forms an angle $\alpha$ in relation to the second face 8 that ranges between 20° and 80° and preferably between 20° and 40°.

The geometrical configuration of the waveguide filter 1 according to this embodiment has the advantage of allowing the core 3 to be produced using an additive manufacturing method in a vertical direction opposite to gravity without having recourse, during the process for manufacturing the core 3, to any brace intended to prevent part of the core from collapsing under the effect of gravity. Indeed, preferably, the angle $\alpha$ of the faces 7 protruding in relation to the horizontal is sufficient to allow the stacked layers to adhere before they are hardened during printing.

According to FIG. 1, the slots 6 are arranged along two opposite walls of the channel 2, which has a square or rectangular transverse section along a plane perpendicular to the longitudinal axis z of the channel 2.

However, it is to be noted that the printing direction of the waveguide filter 1 is essential and printing must be carried out in accordance with its orientation that is illustrated in FIG. 1, since printing in the opposite direction would generate problems with respect to the stability of the structure in the protruding regions defined by the face 8.

Other geometrical configurations of the waveguide filter, according to the invention, with the aforementioned advantages are illustrated in FIGS. 3 to 13.

Figure 3:
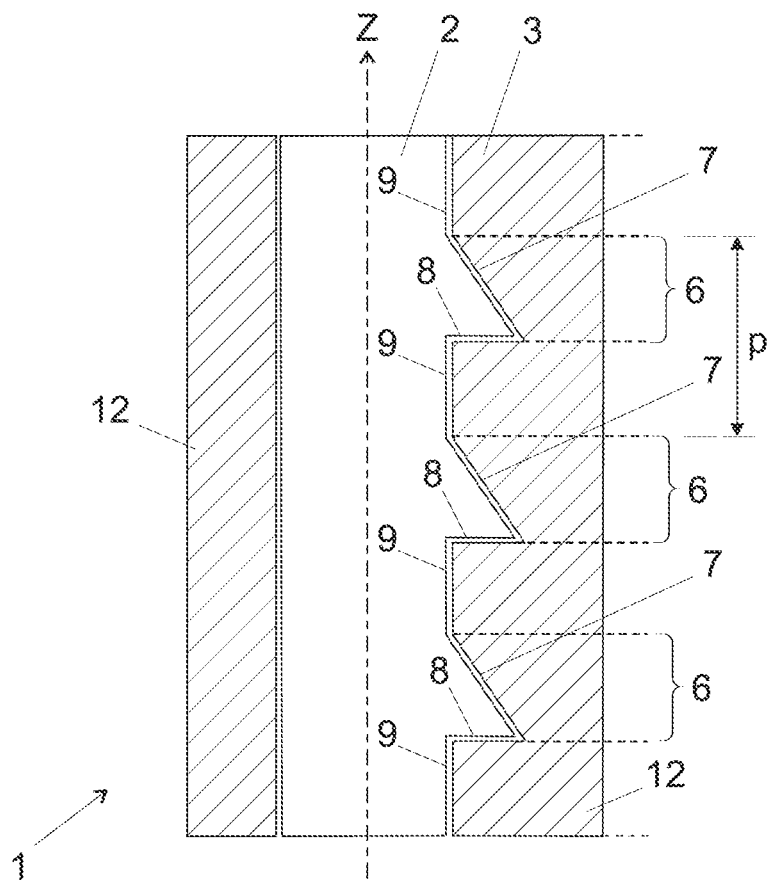
FIG. 3 illustrates a longitudinal section along a waveguide filter according to another embodiment.
Figure 4:
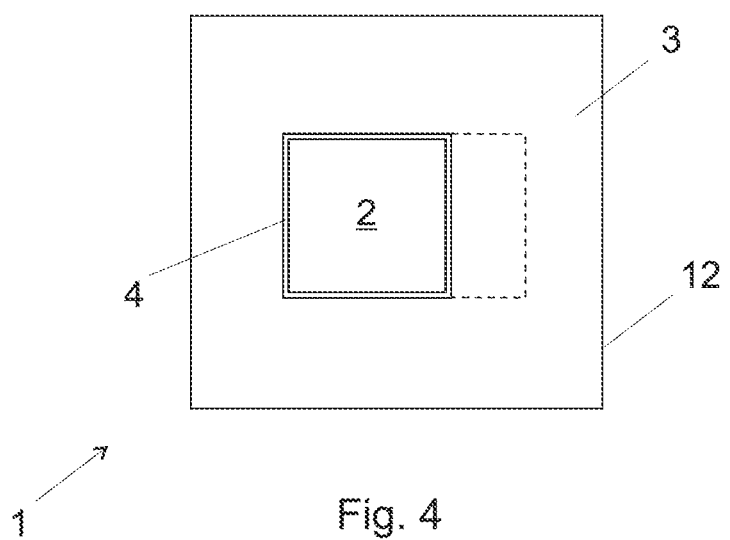
FIG. 4 is a top view of FIG. 3.

According to FIGS. 3 and 4, the waveguide filter 1 comprises a core 3 with a channel 2 with a square or rectangular section along its longitudinal axis and with slots 6 that are identical or similar to the embodiment illustrated in FIGS. 1 and 2, but only arranged along one of the four walls of the channel 2.

Figure 5:
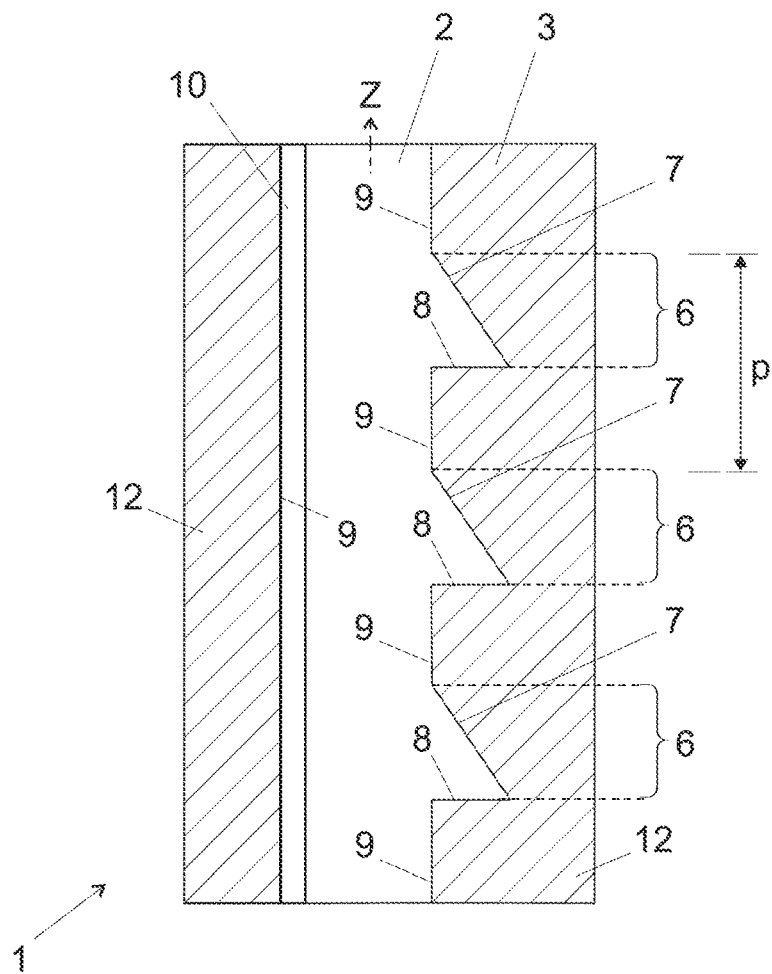
FIG. 5 illustrates a longitudinal section along a waveguide filter according to another embodiment.
Figure 6:
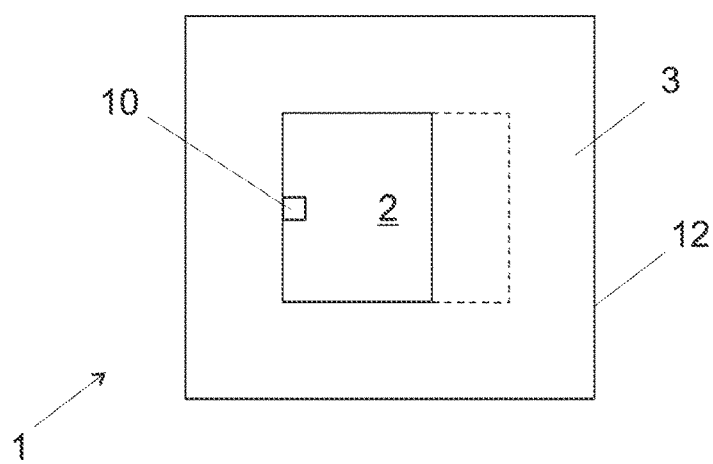
FIG. 6 is a top view of FIG. 5.

According to the embodiment illustrated in FIGS. 5 and 6, the waveguide filter 1 is similar to the filter 1 according to FIGS. 3 and 4, except that it further comprises a rib (ridge) 10 or a septum arranged along a side of the channel 2 that is opposite the side comprising the slots 6. This ridge also influences the modes for transmitting the wave in the channel. The ridge 10 can extend over the entire length of the channel 2, as in the illustrated example, or over a portion of its length. Its height can be constant or variable.

It is also possible to provide a ridge 10 on a wall of the channel 2 other than the wall opposite the cavities 6. It is also possible to provide a plurality of ridges 10, for example, ridges placed on different walls of the channel 2.

Figure 7:
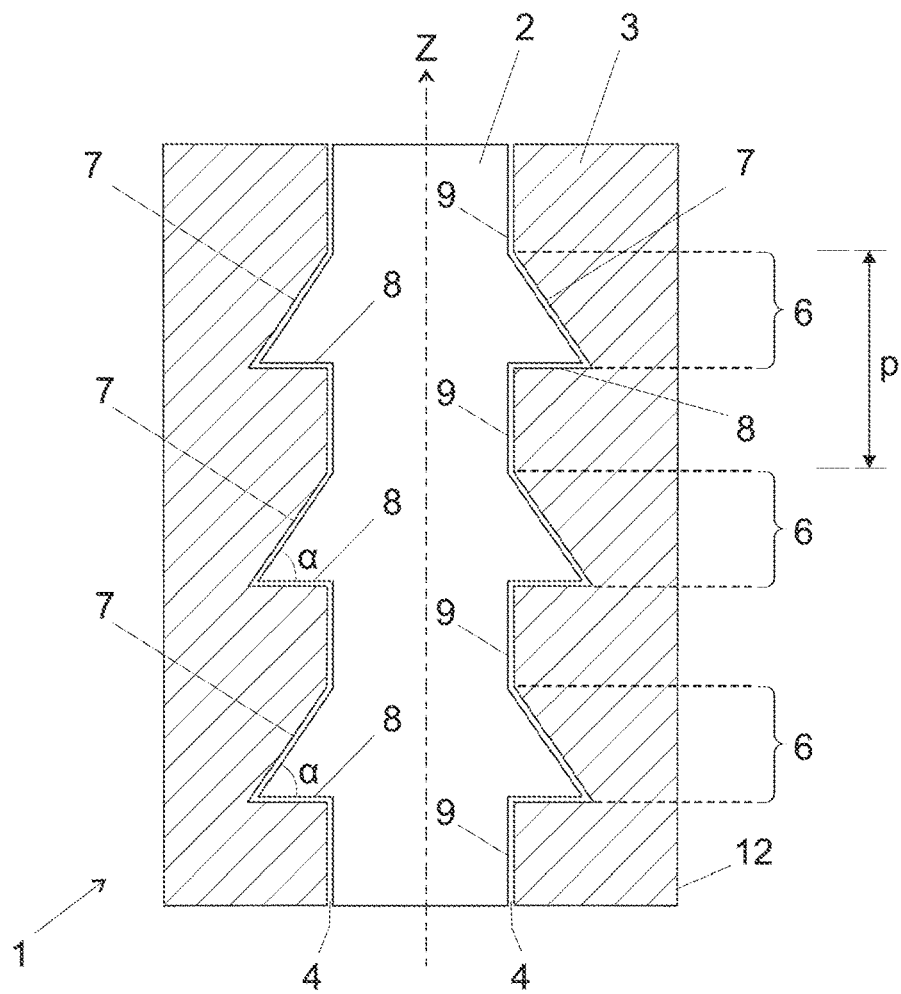
FIG. 7 illustrates a longitudinal section along a waveguide filter according to another embodiment.
Figure 8:
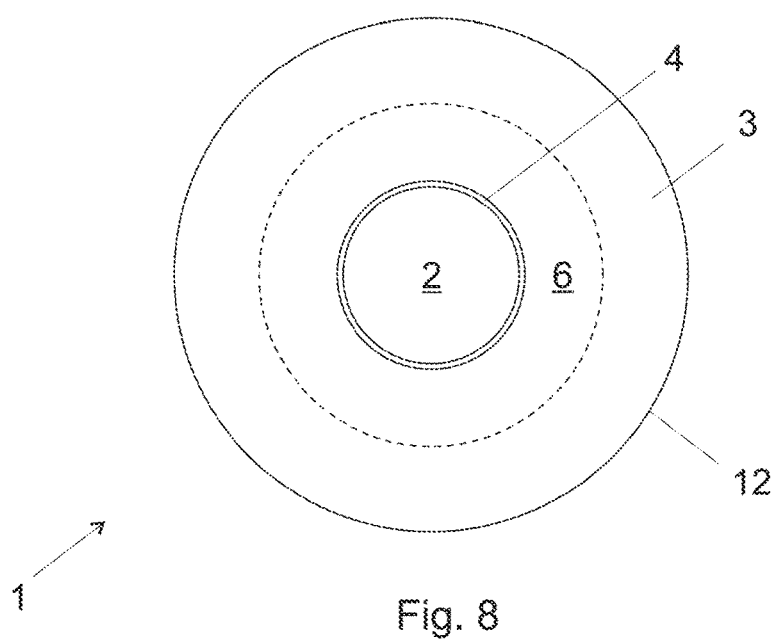
FIG. 8 is a top view of FIG. 7.

In another embodiment, illustrated in FIGS. 7 and 8, the waveguide filter 1 comprises a core 3 with an external cylindrical shape 12 with a cylindrical channel 2 and annular slots 6 along the channel 2. The protruding face 7 and the lower face 8 are also annular.

It is also possible to produce a waveguide with an elliptical or oval section.

Figure 9:
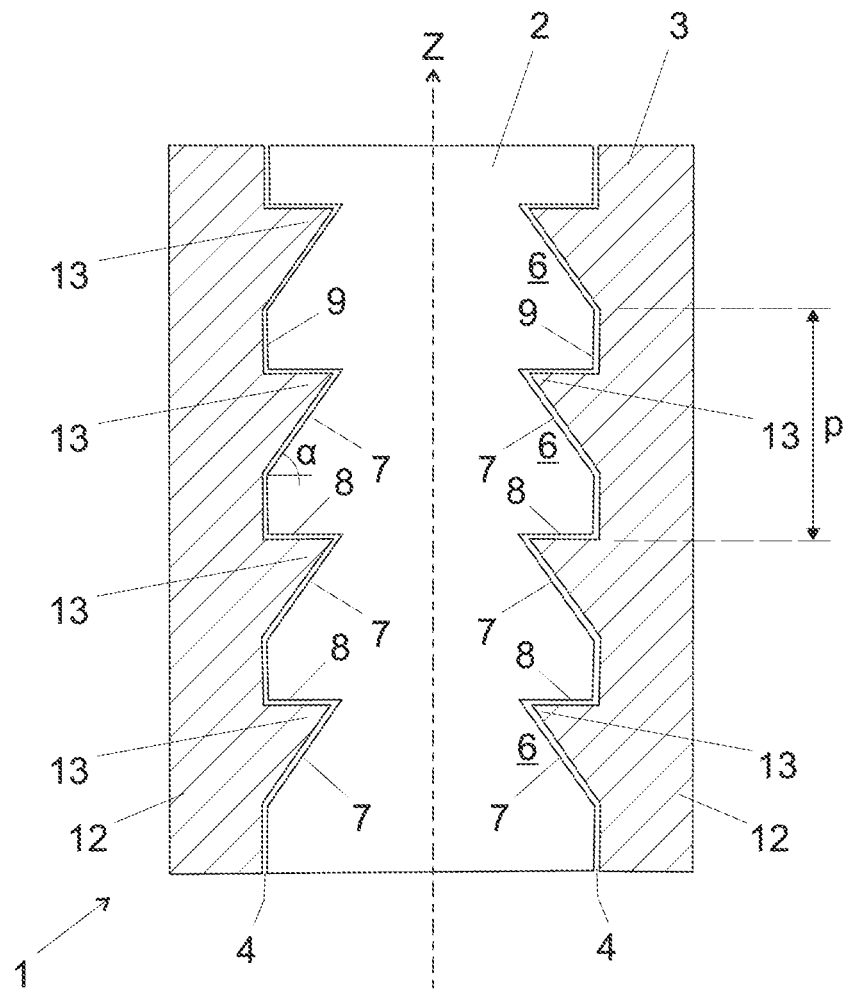
FIG. 9 illustrates a longitudinal section along a waveguide filter according to another embodiment.

According to the embodiment illustrated in FIG. 9, the waveguide filter 1 comprises a core 3 with a channel 2 provided with teeth 13 that radially extend from the cylindrical or prismatic wall of the channel 2 toward the longitudinal axis z. The lower face 7 of the protruding teeth is slanting and forms an angle α in relation to the horizontal in the additive manufacturing position, i.e. when the axis z is substantially vertical. The angle α preferably ranges between 20° and 80° and preferably between 20° and 40°. The upper face 8 of the teeth 13 is substantially horizontal in the printing position.

Figure 10:
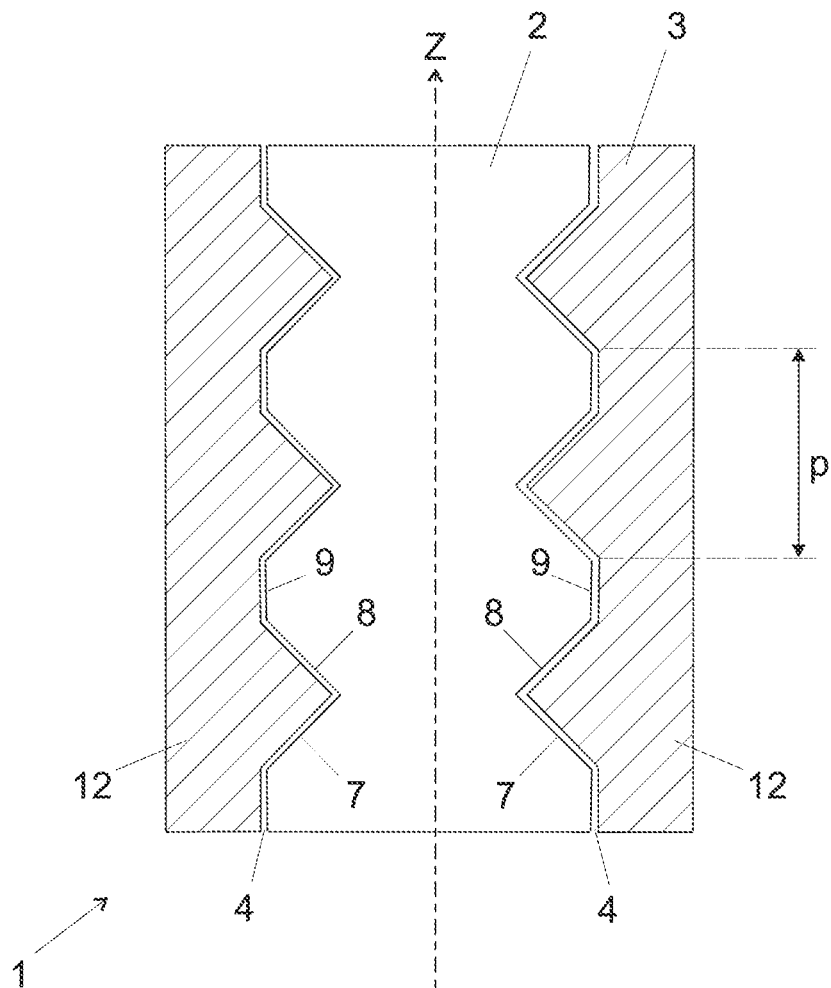
FIG. 10 illustrates a longitudinal section along a waveguide filter according to another embodiment.

The embodiment illustrated in FIG. 10 is similar to that of FIG. 9, except for the fact that the upper face 8 of the teeth 13 is also slanting and forms an angle α in relation to the horizontal in the additive manufacturing position, i.e. when the axis z is substantially vertical. In this example, the two faces 7 and 8 of the teeth are symmetrical in relation to the horizontal plane.

The embodiments of FIGS. 9 to 10 comprise teeth on two opposite walls of the square or rectangular section channel 2. However, it is possible to provide teeth 13 on only one wall. It is also possible to provide one or more other walls with a ridge 10. The shape of the teeth as a section can be non-polygonal, for example, provided with round faces. Finally, teeth also can be provided on a circular, elliptical or oval section channel.

Figure 11:
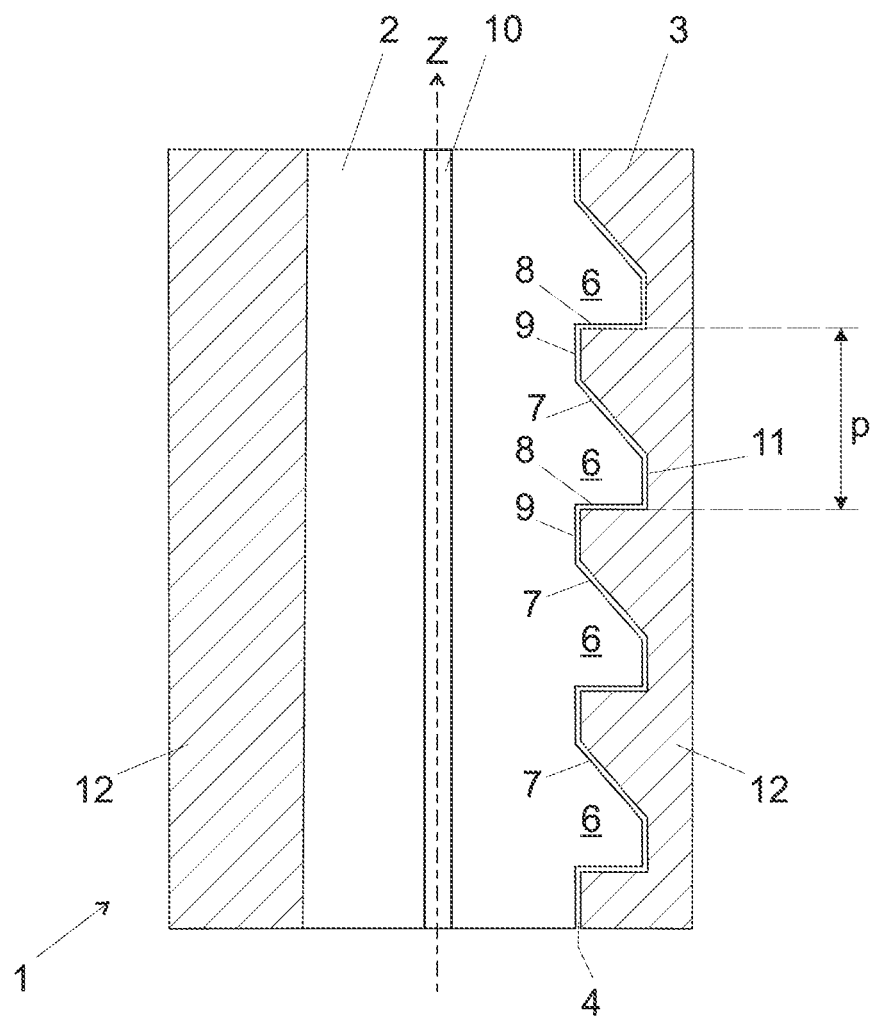
FIG. 11 illustrates a longitudinal section along a waveguide filter according to another embodiment.

The embodiment illustrated in FIG. 11 is similar to that of FIG. 5, except for the fact that the base 14 of the slots 6 is truncated and parallel to the axis z. This arrangement allows the depth of the slots 6 to be reduced and therefore allows the core 2 to be strengthened.

Figure 12:
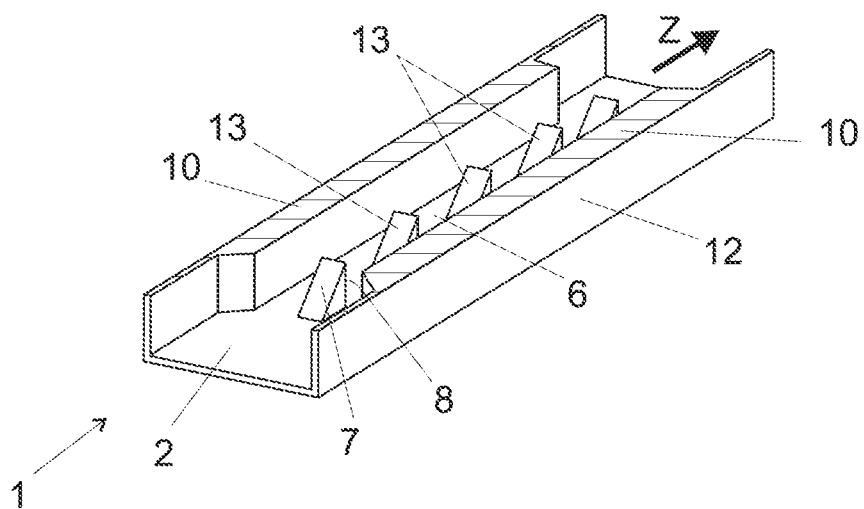
FIG. 12 illustrates a perspective view of a portion of a waveguide filter that is cut longitudinally for the illustration, according to another embodiment.
Figure 13:
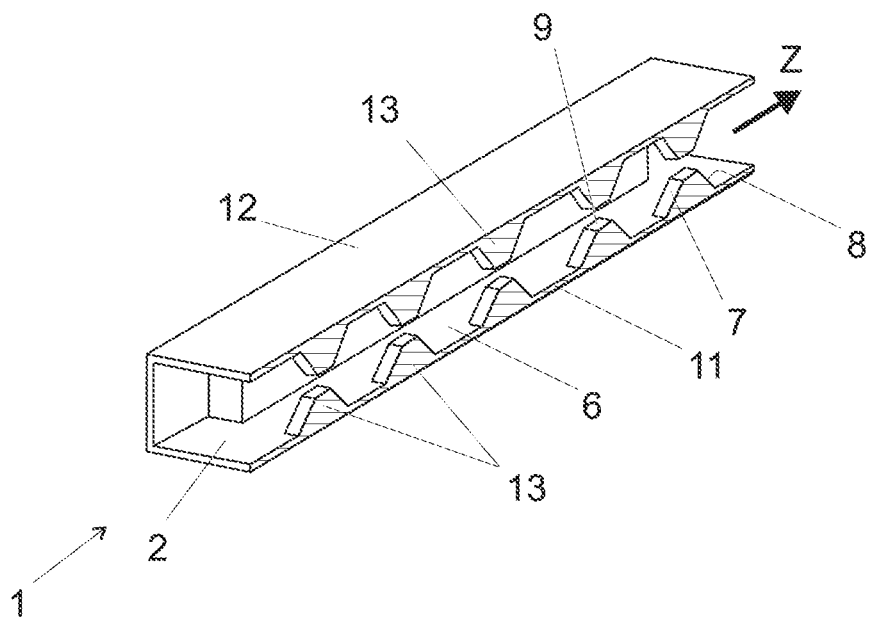
FIG. 13 illustrates a perspective view of a portion of a waveguide filter, one of the walls of which has been repeated for the illustration, according to another view of the embodiment of FIG. 12.

The embodiment illustrated in FIGS. 12 and 13 is similar to that of FIG. 9, except for the fact that the two side walls without teeth are provided with a ridge 10, which extends over all or part of the length of the channel 2. In the example illustrated in FIG. 12, the ridge stops before the lower end of the channel 2 and its lower edge is therefore non-horizontal in the vertical manufacturing position, in order to allow it to be printed despite the protrusion.

Even though the waveguide filter according to the illustrated embodiment comprises three slots 6 separated by two teeth 13 or portions 9 of the channel 2, a filter comprising a different number of slots or of teeth can be implemented according to the desired filtering function.

The slots 6 and the teeth 13 illustrated in the examples have polygonal or longitudinal sections, for example, in the form of a triangle or a trapezium. Other shapes of slots or of teeth nevertheless can be contemplated, including, for example, slots or teeth for which the section comprises round portions (corrugations).

The slots 6 and the teeth 13 illustrated in the examples have dimensions and particularly depths, respectively, with constant heights. Slots and/or teeth with a variable depth and/or height nevertheless can be produced. Furthermore, the step p between successive slots or teeth can be variable.

What is claimed is:

1. A method for manufacturing a waveguide filter comprising:
   additive manufacturing of a core comprising at least one external face and first and second internal faces defining a channel for filtering and guiding waves, each of said first and second internal faces comprising a plurality of slots in order to filter the waves passing through the channel, wherein said first and second internal faces are opposite to each other, and wherein the plurality of slots of the first internal face are arranged symmetrically with the plurality of slots of the second internal face with respect to a plane of symmetry equidistant from said first and second internal faces;
   depositing a metal layer onto said internal faces of the core;
   wherein a longitudinal axis of the channel of the waveguide filter is oriented vertically when it is manufactured, each slot thus comprising an upper face that is protruding during manufacturing; and
   the upper face of said slots being non-horizontal when the core is manufactured.

2. The method as claimed in claim 1, each slot further comprising a lower face, the lower face being inclined in relation to the upper face and in relation to the horizontal during the additive manufacturing of the core.

3. The method as claimed in claim 1, wherein the channel has a square or rectangular transverse section orthogonal to the longitudinal axis, the slots being arranged along exactly two opposite walls of the channel.

4. The method as claimed in claim 1, wherein the core is obtained by SLM additive manufacturing.

5. A waveguide filter obtained by the method of claim 1.

6. The waveguide filter as claimed in claim 5, wherein the core is formed by a conductive material.

7. The waveguide filter as claimed in claim 5, wherein the core is formed by a non-conductive material, said first and second internal faces being covered with a metal layer.

8. The waveguide filter as claimed in claim 5, wherein an inclined face of each slot is slanted in relation to the longitudinal axis of the channel along a plane orthogonal to said longitudinal axis.

9. A method for manufacturing a waveguide filter comprising:
   additive manufacturing of a core comprising at least one external face and internal faces defining a channel for filtering and guiding waves, at least one of said internal faces comprising a plurality of slots in order to filter the waves passing through the channel;
   depositing a metal layer onto said internal faces of the core;
   wherein a longitudinal axis of the channel of the waveguide filter is oriented vertically when it is manufactured, each slot thus comprising an upper face that is protruding during manufacturing;
   the upper face of said slots being non-horizontal when the core is manufactured, and said at least one external face being devoid of slots configured to filter the waves passing through the channel.

10. A method for manufacturing a waveguide filter comprising:
    additive manufacturing of a core comprising at least one external face and internal faces defining a channel for filtering and guiding waves, at least one of said internal faces comprising a plurality of slots in order to filter the waves passing through the channel;
    depositing a metal layer onto said internal faces of the core;
    wherein a longitudinal axis of the channel of the waveguide filter is oriented vertically when it is manufactured, each slot thus comprising an upper face that is protruding during manufacturing;
    the upper face of said slots being non-horizontal when the core is manufactured; and
    two adjacent slots of the plurality of slots being separated from each other by a tooth projecting into said channel, said tooth comprising a lower face and an upper face, the lower face of the tooth being inclined in relation to the upper face of the tooth and in relation to the horizontal during the additive manufacturing of the core.

11. The method as claimed in claim 10, wherein the lower face of each tooth forms an angle ranging between 20° and 80°.

12. The method as claimed in claim 11, wherein said angle ranges between 20° and 40° in relation to the horizontal when the core is manufactured.

13. A method for manufacturing a waveguide filter comprising:
- additive manufacturing of a core comprising at least one external face and internal faces defining a channel for filtering and guiding waves, at least one of said internal faces comprising a plurality of slots in order to filter the waves passing through the channel;
- depositing a metal layer onto said internal faces of the core;
- wherein a longitudinal axis of the channel of the waveguide filter is oriented vertically when it is manufactured, each slot thus comprising an upper face that is protruding during manufacturing;
- the upper face of said slots being non-horizontal when the core is manufactured; and
- wherein the channel has a square or rectangular transverse section orthogonal to the longitudinal axis, the slots being arranged along a single wall of the channel.

14. A method for manufacturing a waveguide filter comprising:
- additive manufacturing of a core comprising at least one external face and internal faces defining a channel for filtering and guiding waves, at least one of said internal faces comprising a plurality of slots in order to filter the waves passing through the channel;
- depositing a metal layer onto said internal faces of the core;
- wherein a longitudinal axis of the channel of the waveguide filter is oriented vertically when it is manufactured, each slot thus comprising an upper face that is protruding during manufacturing;
- the upper face of said slots being non-horizontal when the core is manufactured; and
- wherein the waveguide filter further comprises at least one ridge arranged along a wall of the channel devoid of slots.

* * * * *